A. HAMMER.
Process of Brewing.
No. 47,014. Patented March 28, 1865.
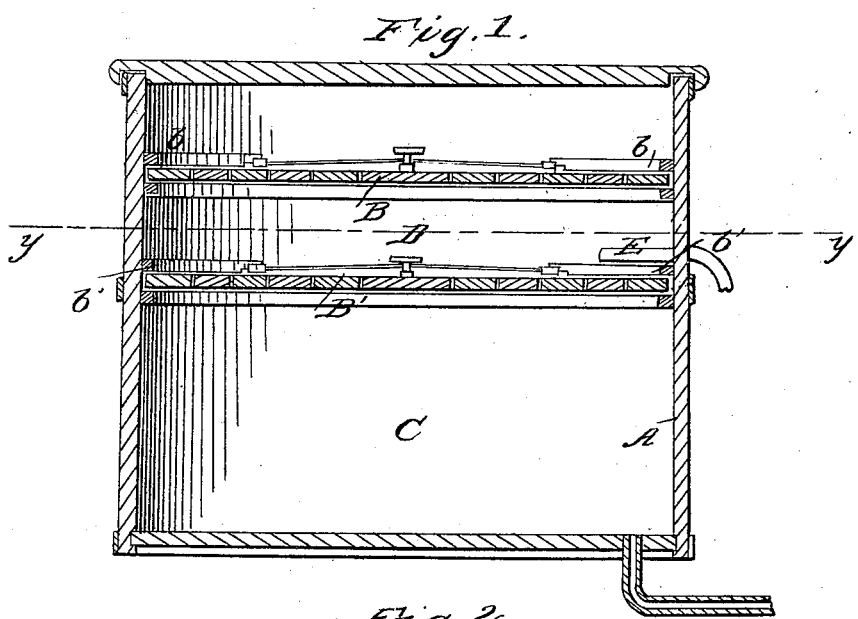
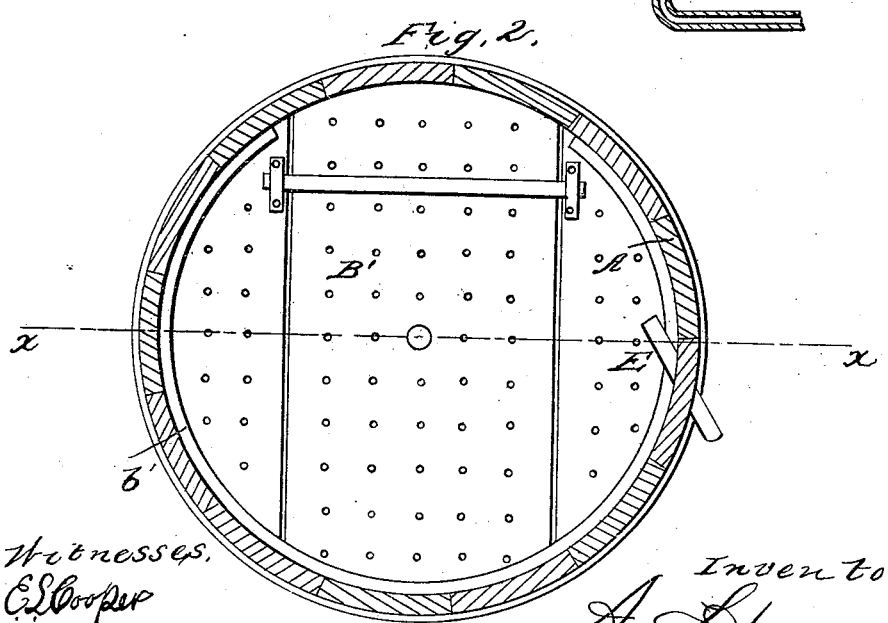
Witnesses:
E. S. Cooper
M. M. Livingston.
Inventor:
A. Hammer

UNITED STATES PATENT OFFICE.

ADOLPH HAMMER, OF NEW YORK, N. Y.

IMPROVED PROCESS FOR BREWING.

Specification forming part of Letters Patent No. 47,014, dated March 28, 1865.

*To all whom it may concern:*

Be it known that I, ADOLPH HAMMER, of the city, county, and State of New York, have invented a new and useful Improved Process of Brewing; and I do hereby declare that the following is a full, clear, and exact description thereof, which will enable others skilled in the art to make and use the same, reference being had to the accompanying drawings, forming part of this specification, in which—

Figure 1 represents a vertical central section of this invention, the line $x\ x$, Fig. 2, indicating the plane of section. Fig. 2 is a horizontal section of the same taken in the plane indicated by the line $y\ y$, Fig. 1.

Similar letters of reference indicate like parts.

This invention consists in forming one or more heating-chambers in the interior of the mash-tun in combination with one or more pipes for the purpose of conveying the heat to said chamber or chambers in such a manner that the water or wort in said chamber or chambers can be heated to any degree required or boiled without exposing the malt, though contained in the same tun, to the same heat or to the boiling-temperature, and that the heat thus conveyed to the liquid can be equally and uniformly diffused throughout the entire mass of malt in the tun.

In practice the liquid contained in the heating chamber or chambers is heated by steam, and the steam pipe or pipes are inserted in oblique directions, so that by the action of the steam itself a whirling motion is imparted to the liquid and the heat is equally diffused throughout the same and through every part of the tun.

This present invention relates to certain improvements in heating brewers' mash-tuns, and forms an addition to certain other improvements on which Letters Patent have been granted to me August 17, 1858.

The tun A is constructed in the usual manner, and it is provided with two or more horizontal partitions, B B', which are made in sections, so that they can be readily removed whenever it is desirable to have access to the interior of the tun for the purpose of cleaning the same, or for any other purpose. Said partitions are held in place by flanged rims $b\ b'$, applied to the interior of the tun, or by any other suitable means, and they are perforated with a large number of small holes, through which the several chambers of the tun communicate with each other. The lowest chamber, C, is intended to contain the malt prepared and mixed with the requisite quantity of water in the ordinary or any other suitable manner. The chamber D, between the two partitions B B', forms the heating-chamber, and it is intended to contain the water or wort, by means of which I convey heat to the mash in the tun. The liquid heated in this chamber passes down through the perforations in the partition B' and is equally diffused throughout the mash in the tun, and by drawing the liquid from the tun below and pumping it back into the heating-chamber D the temperature of the malt can be raised gradually and uniformly to the requisite degree without exposing any portions thereof to an excessive or injurious heat. The partitions B B' also serve as spurgers, and by their application in the manner described the spurging water is separated from the malt, and the latter is protected against the cooling and decomposing influence of the atmospheric air. The liquid in the chamber D is heated by steam, which is introduced by means of one or more steam-pipes E. This pipe is placed in an oblique direction, as clearly shown in Fig. 2, so that by the action of the steam a whirling motion is imparted to the liquid and the heat is equally diffused throughout the entire mass of liquid contained in the chamber, and, furthermore, by keeping the heated liquid in motion the temperature of the malt in the tun is uniformly raised throughout, no portion thereof being allowed to become heated more than desirable. By this arrangement I am enabled to extract from the malt in the tun all the saccharine matter contained therein, and the heat can be conveyed to the malt not only in the most advantageous, but also in the most economical manner.

By placing water above the upper partition, B, the temperature of the wort contained in the chamber D is preserved, and, furthermore, the wort is protected against the decomposing influence of the atmospheric air.

I claim as new and desire to secure by Letters Patent—

1. Heating the mash in brewers' tuns by means of one or more chambers arranged above the chamber containing the mash, substantially as described, when the heated current of fluid passes down into the mash and heats the same gradually to the desired temperature, while said malt is compelled to float.

2. The oblique pipe or pipes E, applied in combination with the heating-chamber D, substantially as and for the purpose described.

A. HAMMER.

Witnesses:
J. P. HALL,
WM. F. MCNAMARA.